United States Patent
Kim

(10) Patent No.: US 10,875,486 B2
(45) Date of Patent: Dec. 29, 2020

(54) AIRBAG DEVICE FOR VEHICLE

(71) Applicant: HYUNDAI MOBIS CO., LTD., Seoul (KR)

(72) Inventor: Jae Hyun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 30 days.

(21) Appl. No.: 16/123,974

(22) Filed: Sep. 6, 2018

(65) Prior Publication Data

US 2019/0077359 A1    Mar. 14, 2019

(30) Foreign Application Priority Data

Sep. 8, 2017 (KR) .......................... 10-2017-0115081

(51) Int. Cl.
| | |
|---|---|
| B60R 21/207 | (2006.01) |
| B60R 21/231 | (2011.01) |
| B60R 21/015 | (2006.01) |
| B60R 21/233 | (2006.01) |
| B60R 21/2338 | (2011.01) |

(52) U.S. Cl.
CPC .. *B60R 21/23138* (2013.01); *B60R 21/01512* (2014.10); *B60R 21/207* (2013.01); *B60R 21/231* (2013.01); *B60R 21/233* (2013.01); *B60R 2021/23107* (2013.01); *B60R 2021/23146* (2013.01); *B60R 2021/23308* (2013.01); *B60R 2021/23386* (2013.01)

(58) Field of Classification Search
CPC ................ B60R 21/207; B60R 21/231; B60R 2021/23146
See application file for complete search history.

(56) References Cited

U.S. PATENT DOCUMENTS

| | | | | |
|---|---|---|---|---|
| 7,549,672 B2 * | 6/2009 | Sato | ...................... | B60R 21/207 280/729 |
| 8,820,830 B2 * | 9/2014 | Lich | ....................... | B60N 2/986 297/216.13 |
| 9,981,624 B2 * | 5/2018 | Perlo | .................. | B60R 21/23138 |
| 9,994,181 B1 * | 6/2018 | Dubaisi | ................. | B60R 21/207 |
| 2016/0082915 A1 * | 3/2016 | Madaras | ............... | B60R 21/231 297/216.2 |

(Continued)

FOREIGN PATENT DOCUMENTS

FR    2927592 A1 *    8/2009    ........... B60R 21/207

OTHER PUBLICATIONS

Cossais et al., Motor vehicle seat, has protection system comprising airbags that are placed at respective lateral sides of seat and integrated to each other using hook and loop fastener during deployment of airbags to form shield, Aug. 21, 2009, EPO, FR 2927592 A1, Machine Translation of Description (Year: 2009).*

(Continued)

*Primary Examiner* — James A English
(74) *Attorney, Agent, or Firm* — Knobbe Martens Olson & Bear LLP

(57) ABSTRACT

An airbag device for a vehicle may include: a housing fixed to a seat on which a passenger is seated; an inflator fixed to the housing, and generating operation gas; and a cushion mounted in the housing, expanded by the operation gas received from the inflator, and deployed in a shape to cover the body of the passenger seated on the seat.

8 Claims, 8 Drawing Sheets

(56) References Cited

U.S. PATENT DOCUMENTS

| | | | |
|---|---|---|---|
| 2016/0347272 A1* | 12/2016 | Kato | B60R 21/207 |
| 2017/0259774 A1* | 9/2017 | Matsushita | B60N 2/427 |
| 2018/0194317 A1* | 7/2018 | Barbat | B60N 2/90 |
| 2018/0222432 A1* | 8/2018 | Schneider | B60R 21/261 |
| 2018/0326938 A1* | 11/2018 | Rickenbach | B60R 21/233 |
| 2019/0016288 A1* | 1/2019 | Schneider | B60R 21/207 |
| 2019/0023214 A1* | 1/2019 | Kitagawa | B60R 21/237 |
| 2019/0054890 A1* | 2/2019 | Kwon | B60R 21/2338 |
| 2019/0152359 A1* | 5/2019 | Spahn | B60N 2/4279 |
| 2019/0176739 A1* | 6/2019 | Song | B60R 21/2338 |
| 2019/0275974 A1* | 9/2019 | Yetukuri | B60R 21/231 |

OTHER PUBLICATIONS

Cossais et al., Motor vehicle seat, has protection system comprising airbags that are placed at respective lateral sides of seat and integrated to each other using hook and loop fastener during deployment of airbags to form shield, Aug. 21, 2009, EPO, FR 2927592 A1, English ABstract (Year: 2009).*

* cited by examiner

AIRBAG DEVICE FOR VEHICLE

CROSS-REFERENCES TO RELATED APPLICATIONS

The present application claims priority to Korean application number 10-2017-0115081, filed on Sep. 8, 2017, which is incorporated by reference in its entirety.

BACKGROUND OF THE INVENTION

The present invention relates to an airbag device for a vehicle, and more particularly, to an airbag device for a vehicle, which can deploy a cushion in case of a vehicle collision, and prevent an injury of a passenger even though the passenger has changed his seating position.

In general, an airbag device for a vehicle refers to a safety device that reduces a shock applied to a passenger by deploying an airbag cushion in case of a collision accident. The airbag device may include a DAB (Driver Air-Bag), PAB (Passenger Air-Bag), SAB (Side Air-Bag) and CAB (Curtain Air-Bag).

When passengers are seated in a driver seat and passenger seat, respectively, an airbag can be deployed between the driver seat and passenger seat in case of a collision accident, thereby preventing the passengers from bumping into each other.

In the related art, the airbag for preparing against a collision accident which may occur during driving is installed inside interior parts of the vehicle. For example, the airbag may be installed in a horn actuator positioned in the center of a steering wheel, or installed in a dashboard positioned in front of the passenger seat. Therefore, a vehicle where the seating position of a passenger can be changed, such as an autonomous vehicle, may not normally protect a passenger who has changed his seating position, even though the airbag installed in the horn actuator positioned in the center of the steering wheel or the airbag installed in the dashboard is operated in case of a vehicle collision. Thus, there is a demand for a device capable of solving such a problem.

SUMMARY OF THE INVENTION

Embodiments of the present invention are directed to an airbag device for a vehicle, which can deploy a cushion in case of a vehicle collision, and prevent an injury of a passenger even though the passenger has changed his seating position.

In one embodiment, an airbag device for a vehicle may include: a housing fixed to a seat on which a passenger is seated; an inflator fixed to the housing, and generating operation gas; and a cushion mounted in the housing, expanded by the operation gas received from the inflator, and deployed in a shape to cover the body of the passenger seated on the seat.

The cushion may include: a first chamber stored in the housing, and expanded by the operation gas generated through the inflator so as to cover one side of the passenger body; and a second chamber stored in the housing with the first chamber, and expanded by the operation gas generated through the inflator so as to cover the other side of the passenger body.

The first and second chambers may be deployed in an L-shape to cover the passenger body.

The first chamber may include: a first connection part connected to the inflator and deployed to the outside of the seat; and a first extension part bent from an end of the first connection part so as to be positioned at the front surface of the one side of the passenger body.

The second chamber may include: a second connection part connected to the inflator and deployed to the outside of the seat; and a second extension part bent from an end of the second connection part so as to be positioned at the front surface of the other side of the passenger body.

The other side of the passenger body, covered by the second chamber, may indicate the opposite side of the one side of the passenger body, covered by the first chamber.

The first and second extension parts may overlap each other by a predetermined length.

The cushion may further include a third chamber expanded from the first or second chamber, and deployed in a shape to cover the face of the passenger.

The first and second chambers may be deployed in a shape to cover the outside of the chest of the passenger.

The cushion may include: a fourth chamber positioned under the first chamber, and expanded by the operation gas generated through the inflator so as to cover the one side of the passenger body; and a fifth chamber positioned under the second chamber, and expanded by the operation gas generated through the inflator so as to cover the other side of the passenger body.

The fourth and fifth chambers may be deployed in an L-shape to cover the passenger body.

DESCRIPTION OF SPECIFIC EMBODIMENTS

Hereafter, an airbag device for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
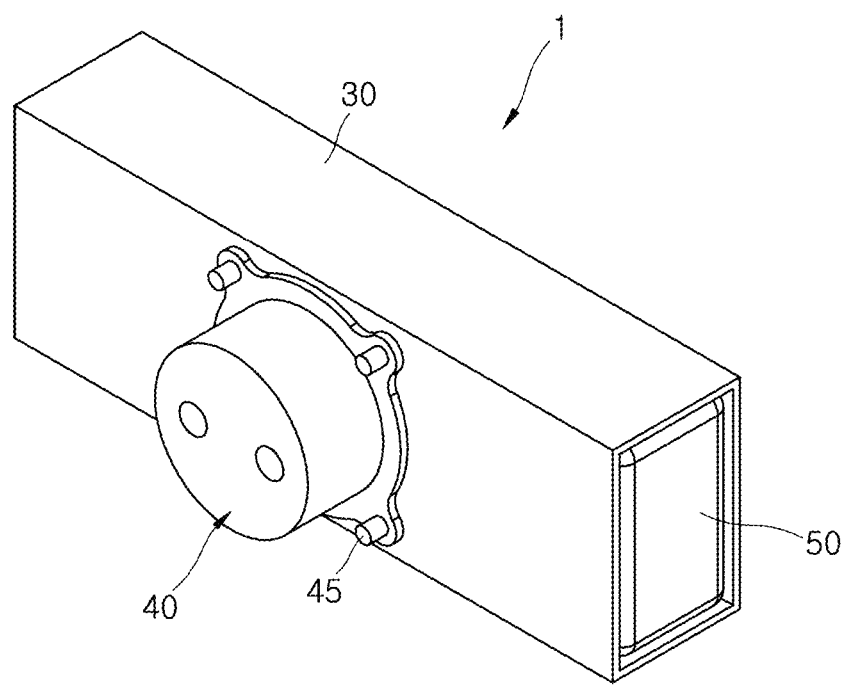
FIG. 1 is a perspective view schematically illustrating an airbag device for a vehicle in accordance with an embodiment of the present invention.
Figure 2:
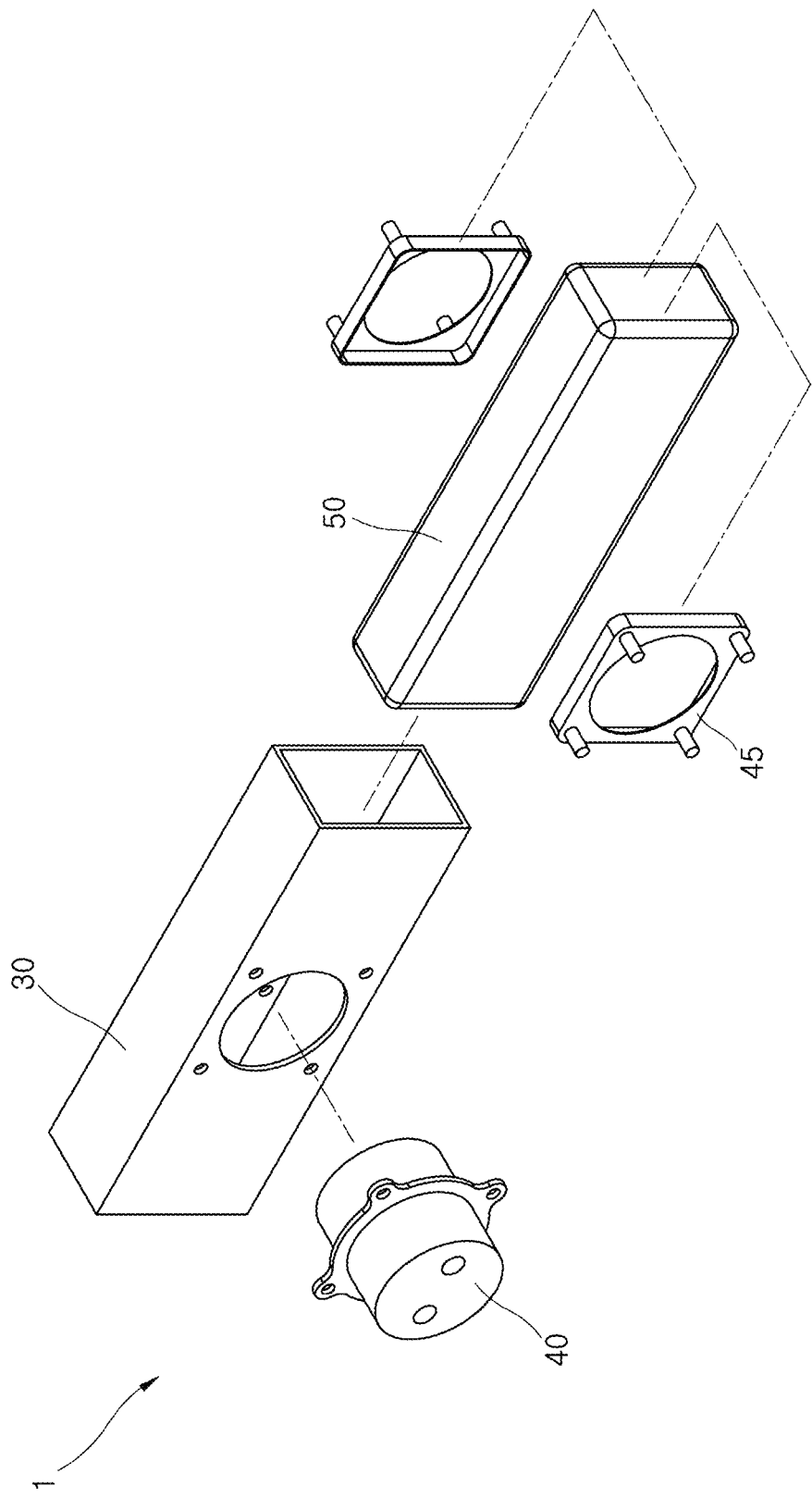
FIG. 2 is an exploded perspective view of the airbag device for a vehicle in accordance with the embodiment of the present invention.
Figure 3:
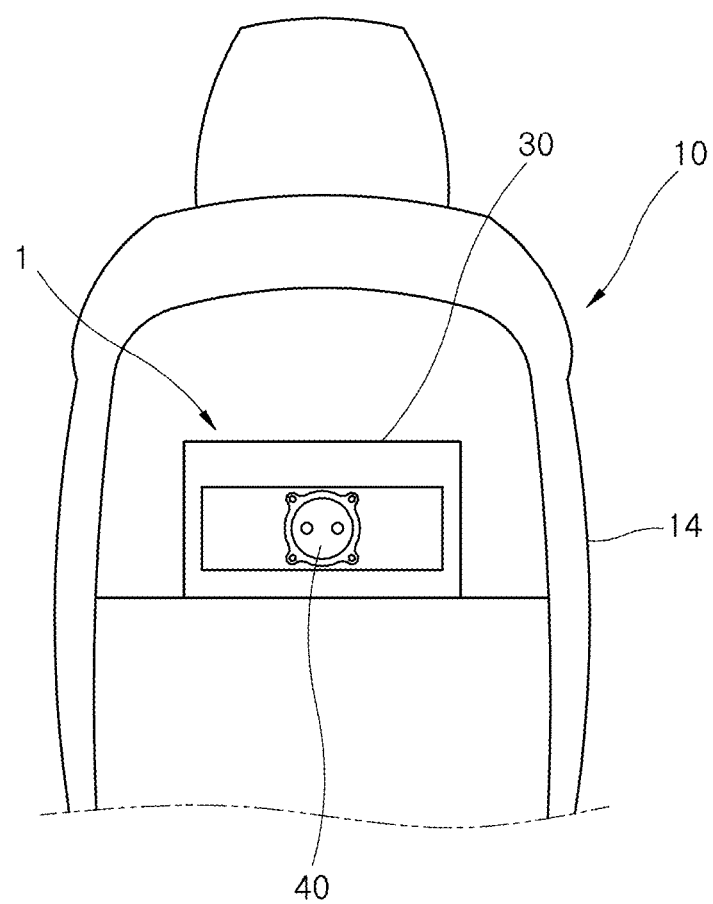
FIG. 3 schematically illustrates that the airbag device for a vehicle in accordance with the embodiment of the present invention is installed at the rear of a seat.
Figure 4:
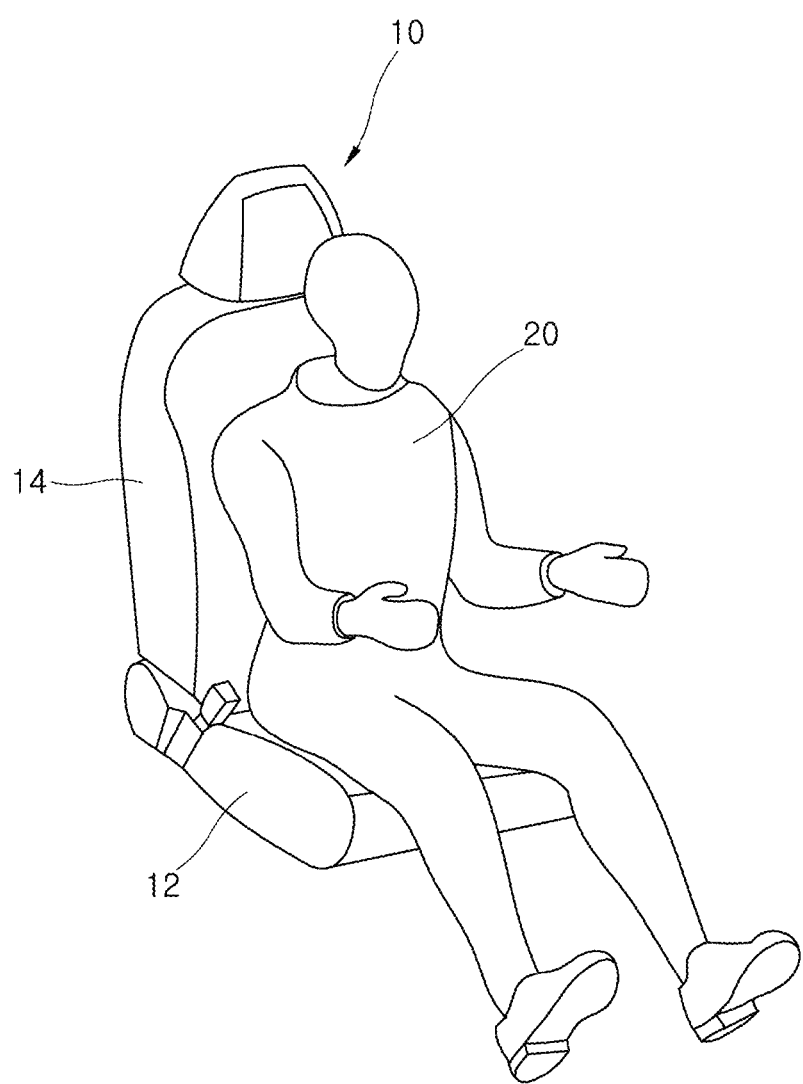
FIG. 4 is a perspective view illustrating a state before the airbag device for a vehicle in accordance with the embodiment of the present invention is operated.
Figure 5:
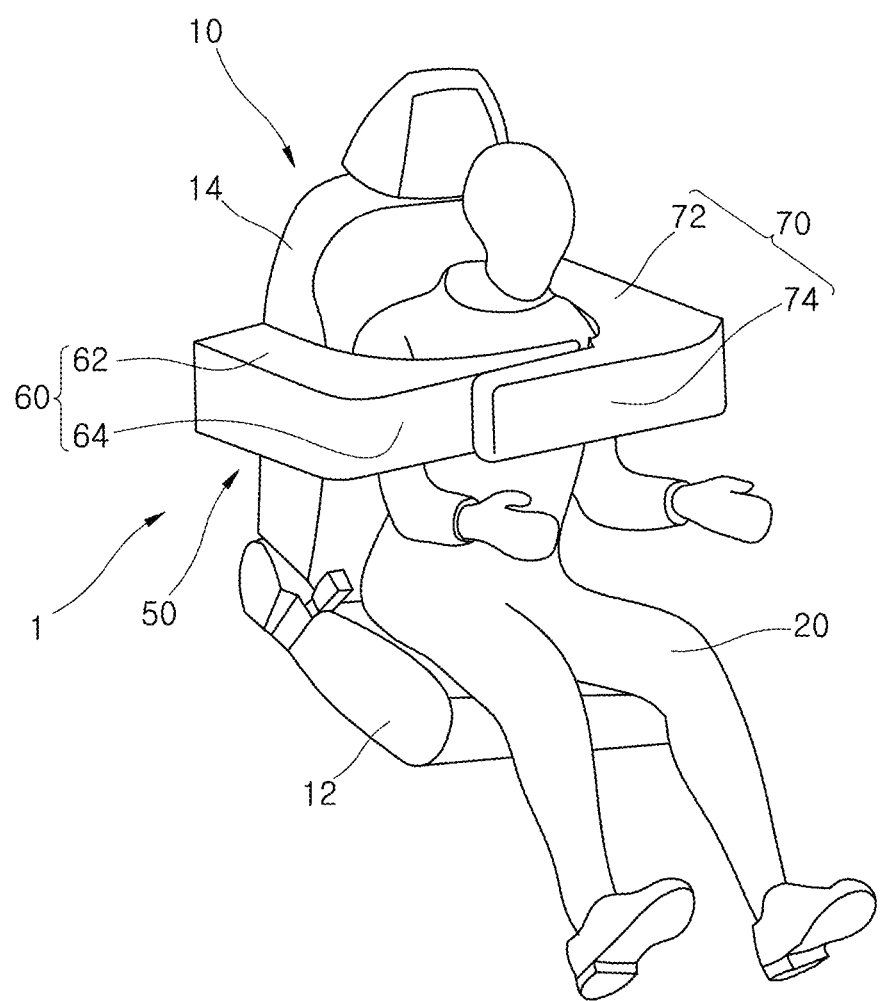
FIG. 5 is a perspective view illustrating that the airbag device for a vehicle in accordance with the embodiment of the present invention is operated to deploy a cushion.
Figure 6:
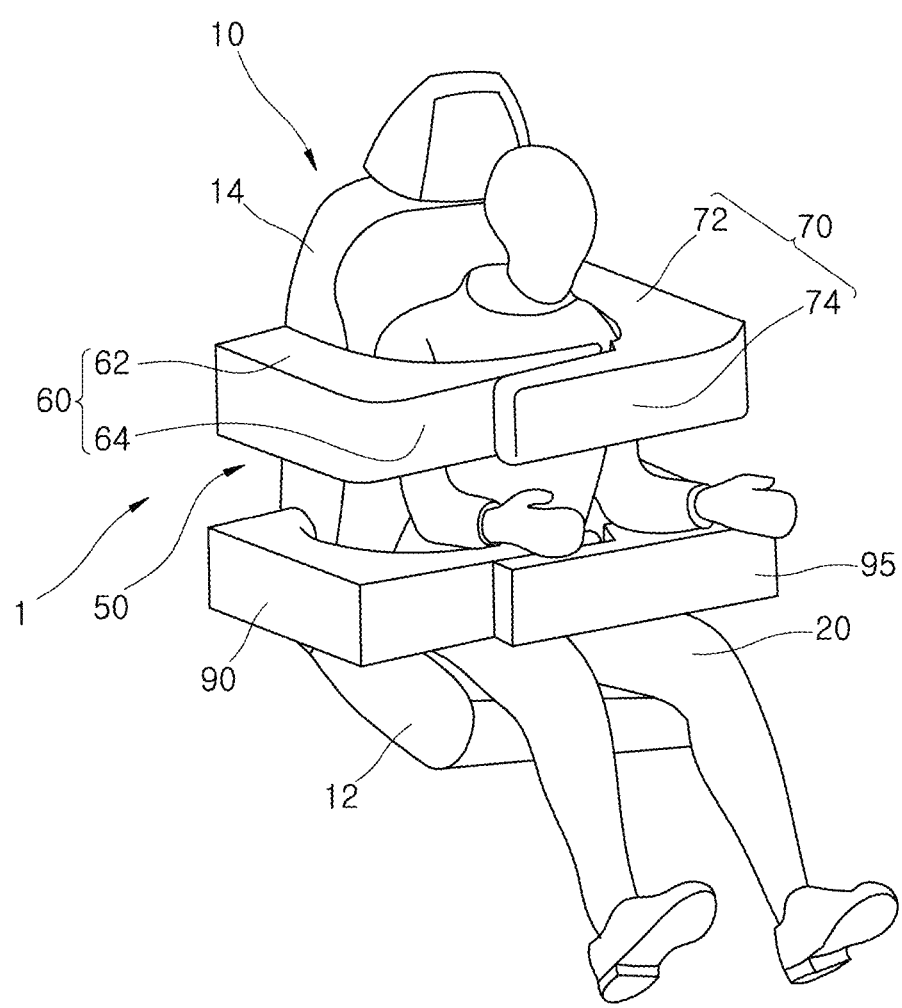
FIG. 6 is a perspective view illustrating the cushion in accordance with the embodiment of the present invention is deployed to protect the upper and lower bodies of a passenger.
Figure 7:
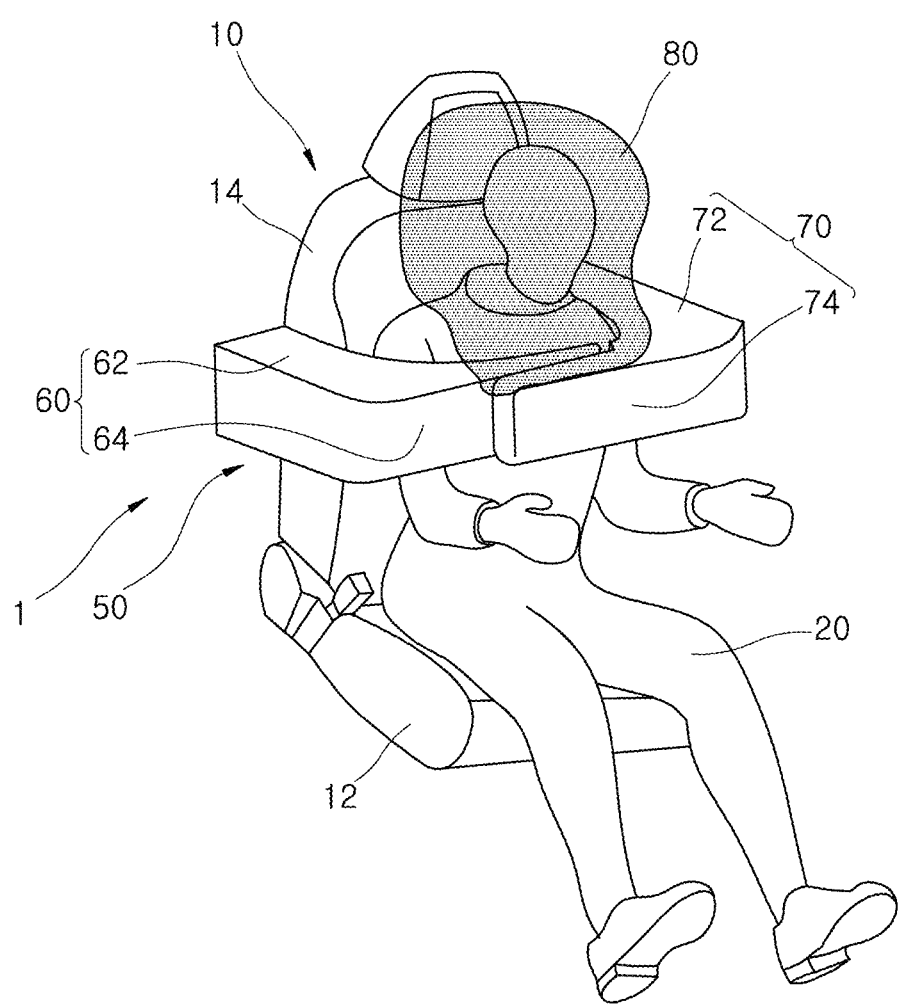
FIG. 7 is a perspective view illustrating that a third chamber in accordance with the embodiment of the present invention is deployed to protect the head of the passenger.
Figure 8:
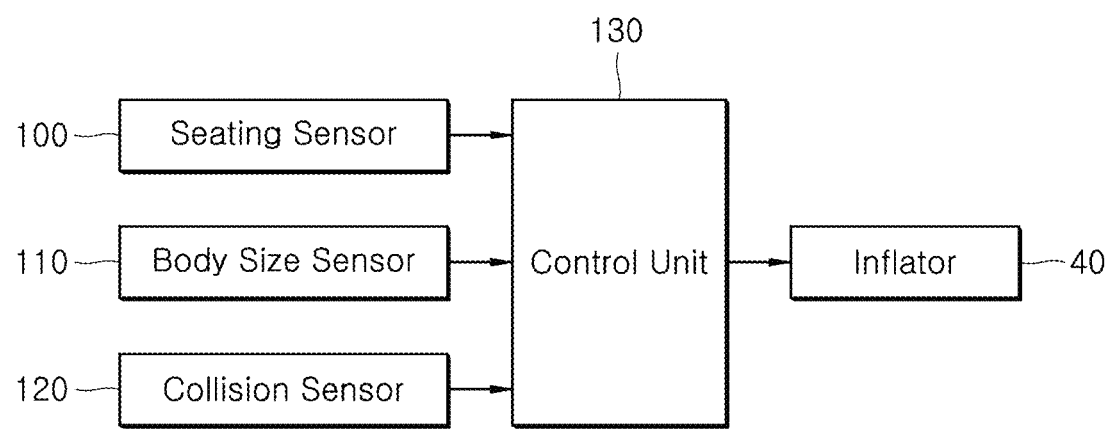
FIG. 8 is a block diagram illustrating the airbag device for a vehicle in accordance with the embodiment of the present invention.

FIG. 1 is a perspective view schematically illustrating an airbag device for a vehicle in accordance with an embodiment of the present invention, FIG. 2 is an exploded perspective view of the airbag device for a vehicle in accordance with the embodiment of the present invention, FIG. 3 schematically illustrates that the airbag device for a vehicle in accordance with the embodiment of the present invention is installed at the rear of a seat, FIG. 4 is a perspective view illustrating a state before the airbag device for a vehicle in accordance with the embodiment of the present invention is operated, FIG. 5 is a perspective view illustrating that the airbag device for a vehicle in accordance with the embodiment of the present invention is operated to deploy a cushion, FIG. 6 is a perspective view illustrating the cushion in accordance with the embodiment of the present invention is deployed to protect the upper and lower bodies of a passenger, FIG. 7 is a perspective view illustrating that a third chamber in accordance with the embodiment of the present invention is deployed to protect the head of the passenger, and FIG. 8 is a block diagram illustrating the airbag device for a vehicle in accordance with the embodiment of the present invention.

As illustrated in FIGS. 1 to 5 and 8, the airbag device 1 for a vehicle in accordance with the embodiment of the present invention may include a housing 30, an inflator 40 and a cushion 50. The housing 30 may be fixed to a seat 10 on which a passenger 20 is seated. The inflator 40 may be fixed to the housing 30 and generate operation gas. The cushion 50 may be expanded by the operation gas received from the inflator 40 and deployed in a shape to cover the body of the passenger 20 seated on the seat 10.

The plurality of seats 10 may be installed in the vehicle, and the airbag device 1 for a vehicle may be installed at the rear of each of the seats 10. The seat 10 may include a base part 12 for supporting the hip of the passenger 20, and a back support part 14 extended upward from the base part 12 so as to support the back of the passenger 20. The airbag device 1 for a vehicle in accordance with the embodiment of the present invention may be installed at the rear of the back support part 14. In case of a vehicle collision, the airbag device 1 may be deployed in a shape to cover the body of the passenger 20 seated on the seat 10, and prevent the passenger 20 from being thrown out of the seat 10.

The housing 30 may be formed in various shapes, as long as the housing 30 can be fixed to the seat 10 on which the passenger 20 is seated. Both sides of the housing 30 in accordance with the embodiment of the present invention may be opened in order to deploy the cushion 50. The housing 30 may have an inner space for storing the cushion 50. The housing 30 may be installed so as not to be exposed to the outside, because the housing 30 is positioned inside the outer cover of the seat 10. The housing 30 may be installed in a horizontal direction, and passages formed at both sides of the housing 30 may face the left and right sides of the seat 10.

The inflator 40 may be fixed to the housing 30, and generate operation gas according to a control signal of a control unit 130. The inflator 40 in accordance with the embodiment of the present invention may be fixed to the center of the housing 30, and installed so as to communicate with the cushion 50. A fixing bracket 45 may be inserted into the cushion 50, and a bolt installed through the fixing bracket 45 may be sequentially passed through the cushion 50 and the housing 30 and fixed to the inflator 40. That is, the housing 30 may be fixed to the rear of the seat 10, and the housing 30, the cushion 50 and the inflator 40 are connected to one another through the fixing bracket 45.

The cushion 50 may be expanded by the operation gas received from the inflator 40, and formed in various shapes as long as the cushion 50 can be deployed in a shape to cover the body of the passenger 20 seated on the seat 10. The cushion 50 in accordance with the embodiment of the present invention may include first and second chambers 60 and 70.

The first chamber 60 may be stored in the housing 30, and formed in various shapes as long as the first chamber 60 can be expanded by the operation gas generated through the inflator 40 and cover one side of the body of the passenger 20. For the deployment of the cushion 50, a cutting line may be formed on the outer cover of the seat 10. One side of the first chamber 60 may be connected to the housing 30, and the first chamber 60 may be deployed in a shape to cover the one side of the body of the driver, while tearing the cutting line formed on one surface of the seat 10.

The second chamber 70 may be stored in the housing 30 with the first chamber 60, and formed in various shapes as long as the first chamber 60 can be expanded by the operation gas generated through the inflator 40 and cover the other side of the body of the passenger 20. One side of the second chamber 70 may be connected to the housing 30, and the second chamber 70 may be deployed in a shape to cover the other side of the body of the driver, while tearing the cutting line formed on the other surface of the seat 10. The other side of the passenger body, covered by the second chamber 70, may correspond to the opposite side of the one side of the passenger body, covered by the first chamber 60.

That is, the first and second chambers 60 and 70 may be deployed in an L-shape outside the seat 10, and form a ring shape to cover the body of the passenger 20. Since the first and second chambers 60 and 70 are deployed in a shape to cover the outside of the chest or abdomen of the passenger, the upper body of the passenger 20 can be prevented from shaking and colliding with an interior part of the vehicle.

The first and second chambers 60 and 70 may be deployed in an L-shape to the outside of the seat 10, but the deployment shape of the first and second chambers 60 and 70 which are deployed from the housing 30 positioned inside the outer cover of the seat 10 and cover the body of the passenger 20 may correspond to a U-shape. The deployment shape of the first and second chambers 60 and 70 may be controlled by an external tether such as a string. Furthermore, the deployment shape may be controlled by an inner tether such as a string installed in each of the chambers or a film with a hole through which the operation gas is passed.

Since both ends of the first and second chambers 60 and 70 overlap each other at the front side of the body of the passenger 20, the movement of the completely deployed first and second chambers 60 and 70 can be constrained so as to stably protect the body of the passenger 20.

The first chamber 60 in accordance with the present embodiment may include a first connection part 62 connected to the inflator 40 and deployed to the outside of the seat 10 so as to be positioned at one side of the passenger 20, and a first extension part 64 bent from an end of the first connection part 62 so as to be positioned at the front surface of the one side of the body of the passenger 20. The second chamber 70 in accordance with the present embodiment may include a second connection part 72 connected to the inflator 40 and deployed to the outside of the seat 10 so as to be positioned at the other side of the passenger 20, and a second extension part 74 bent from an end of the second connection part 72 so as to be positioned at the front surface of the other side of the body of the passenger 20.

The first and second extension parts 64 and 74 may be installed so as to overlap each other by a predetermined length. The first extension part 64 may be positioned in a direction facing the passenger 20, and the second extension part 74 may be positioned outside the first extension part 64. Since the inside of the first extension part 64 facing the second extension part 74 has a groove to form a stepped portion, an operation of maintaining the shape while the outside of the first extension part 64 comes in contact with the inside of the second extension part 74 can be more easily performed.

FIG. 7 illustrates a modification of the cushion 50 in accordance with the embodiment of the present invention. As illustrated in FIG. 7, the cushion 50 may further include a third chamber 80 deployed from the first or second chamber 60 or 70 so as to cover the face of the passenger 20. The third chamber 80 may be connected to the first or second chamber 60 or 70, and expanded at a point of time that the expansion of the first or second chamber 60 or 70 is completed, or expanded when the first or second chamber 60 or 70 is expanded in a preset shape.

The third chamber 80 in accordance with the present embodiment may be connected to the second extension part 74 of the second chamber 70, and folded and stored in the housing 30 with the second chamber 70. After the first and second chambers 60 and 70 are completely deployed by the operation gas of the inflator 40, the third chamber 80 may be deployed to cover the entire face of the passenger 20. Thus, the entire part of the passenger 20 seated on the seat 10 can be covered. Therefore, although the passenger 20 changes the position and angle of the seat 10 to any direction, the cushion 50 can be deployed to control the movement of the passenger 20 in case of a collision accident, thereby preventing an occurrence of fatal injury.

FIG. 6 illustrates another modification of the cushion 50 in accordance with the embodiment of the present invention. As illustrated in FIG. 6, the cushion 50 may further include fourth and fifth chambers 90 and 95 which are deployed with the first and second chambers 60 and 70 so as to cover the body of the passenger 20.

The fourth chamber 90 may be positioned under the first chamber 60, and expanded by the operation gas generated through the inflator 40 so as to form a cushion for covering one side of the body of the passenger 20. The fifth chamber 95 may be positioned under the second chamber 70, and expanded by the operation gas generated through the inflator 40 so as to form a cushion for covering the other side of the body of the passenger 20. The fourth and fifth chambers 90 and 95 may be deployed in an L-shape to cover the body of the passenger 20, and constrain the body of the passenger from excessively shaking in case of a collision accident.

The fourth and fifth chambers 90 and 95 may be positioned under the first and second chambers 60 and 70, respectively, and installed in a shape to cover the abdomen of the passenger 20. The housing 30 and the inflator 40 may be additionally installed to deploy the fourth and fifth chambers 90 and 95, or the inflator 40 for operating the first and second chambers 60 and 70 may be used in common.

Since the shapes and operations of the fourth and fifth chambers 90 and 95 are the same as the first and second chambers 60 and 70, the detailed descriptions thereof are omitted herein.

As illustrated in FIG. 8, the control unit 130 to operate the inflator may receive measured values from a seating sensor 100, a body size sensor 110 and a collision sensor 120.

The seating sensor 100 may measure information on whether the passenger 20 is seated on the seat 10, and transfer the measured value to the control unit 130. If the passenger 20 is not seated, the airbag device 1 mounted in the corresponding seat 10 does not operate in case of a vehicle collision.

The body size sensor 110 may measure the body size of the passenger 20 seated on the seat 10, and transfer the measured value to the control unit 130. For example, when a child is seated on the seat 10, the body size sensor 110 may measure the body size of the child, and transfer the measured value to the control unit 130. The control unit 130 may operate the third and fifth chambers 80 and 95 to stably protect the child, and not operate the first and second chambers 60 and 70 which are likely to cause an injury while colliding with the head of the child.

The collision sensor 120 may measure a shock applied to the vehicle, and transfer the measured value to the control unit 130.

Hereafter, the operation of the airbag device 1 for a vehicle in accordance with the embodiment of the present invention will be described in detail with reference to the accompanying drawings.

The control unit 130 may receive the measured values of the seating sensor 100, the body size sensor 110 and the collision sensor 120, and generate a control signal for operating the inflator 40. The inflator 40 may be operated to deploy the cushion 50. At this time, the cushion 50 may be expanded in a shape to cover the body of the passenger 20 seated on the seat 10.

When the operation gas is transferred to the cushion 50 folded in the housing 30, the chambers may be deployed to the outside of the seat 10 through the side surfaces of the seat 10, while tearing the outer cover of the seat 10. As illustrated in FIG. 5, the first and second chambers 60 and 70 may be deployed and expanded in a shape to cover the body of the passenger 20 seated on the seat 10.

In order to more stably constrain movement of the passenger, the fourth and fifth chambers 90 and 95 can be deployed with the first and second chambers 60 and 70 while covering the waist of the passenger 20 as illustrated in FIG. 6, thereby preventing an increase in injury of the passenger 20.

As illustrated in FIG. 7, the third chamber 80 may be deployed to protect the head of the passenger 20, after the first and second chambers 60 and 70 have been deployed. Since the third chamber 80 is expanded in the same shape as a driver airbag and covers the head of the passenger 20, the head of the passenger 20 can be prevented from being excessively moved by a shock or the like.

The airbag device 1 for a vehicle, which is operated as described above, may be mounted in not only a seat 10 installed in an existing vehicle or transporter, but also a seat 10 installed in an autonomous vehicle. When the airbag device 1 for a vehicle is installed in an autonomous vehicle, the airbag device 1 can protect a passenger seated on the seat 10 even though the seat 10 is moved to various positions.

In accordance with the present embodiment, since the airbag device 1 for a vehicle is installed at the rear of the seat 10, the cushion 50 may be deployed from the seat 10 so as to cover and protect the passenger 20, even when the seating position of the passenger 20 is changed to various locations as in an autonomous vehicle. Therefore, it is possible to prevent an injury of the passenger. Furthermore, the airbag device 1 can be applied to an autonomous vehicle so as to protect the passenger 20 without a limitation in changing the position of the seat 10. Furthermore, the airbag device 1 can guarantee free seating positions to the passenger 20 in an autonomous vehicle, and secure more comfort during autonomous driving. Furthermore, since airbag modules mounted in the vehicle can be incorporated into one airbag device 1, the number of assembling processes for the airbag modules can be reduced, which makes it possible to improve productivity while reducing the manufacturing cost.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag system for a vehicle, comprising:
   a seat comprising a seat base and a back support for allowing a passenger to seat;
   a housing fixed to a rear of the back support;
   an inflator fixed to the housing, and configured to generate operation gas; and
   first and second cushions contained in the housing when not deployed and configured to cover the passenger's body when deployed,
   wherein, when the operation gas is supplied to the first and second cushions from the inflator, each of the first and second cushions is deployed and extends from the housing to a front of the passenger's body for covering one of sides of the passenger's body and the front of the passenger's body,
   wherein each of the first and second cushions comprises a front extension disposed in front of the passenger's body such that, when deployed, the back support and the passenger's body are disposed between the housing and the front extension of each of the first and second cushions,
   wherein the housing comprises a first side opening and a second side opening disposed opposite to the first side opening, wherein the housing extends in a traverse direction of the back support such that the first side opening is opened toward a first side of the back support and the second side opening is opened toward a second side of the back support,
   wherein, when the operation gas is supplied to the first and second cushions from the inflator to inflate the first and second cushions, the first cushion extends out of the housing to the front of the passenger's body such that the first cushion which is inflated is disposed over and covers the first side of the back support in addition to the passenger's body, and the second cushion which is inflated is disposed over and covers the second side of the back support in addition to the passenger's body.

2. The airbag system of claim 1, wherein the first and second cushions are deployed in an L-shape to cover the passenger's body.

3. The airbag system of claim 1, wherein the first cushion which is inflated comprises a side extension and the front extension extending from the side extension, wherein the side extension of the first cushion which is inflated is configured to cover the first side of the back support and a first side of the passenger's body, wherein the front extension of the first cushion is configured to cover the front of the passenger's body.

4. The airbag system of claim 3, wherein the second cushion which is inflated comprises a side extension and the front extension extending from the side extension, wherein the side extension of the second cushion is configured to cover the second side of the back support and a second side of the passenger's body, wherein the front extension of the second cushion is configured to cover the front of the passengers body.

5. The airbag system of claim 4, wherein the front extensions of the first and second cushions overlap each other by a predetermined length such that the front extension of the first cushion is disposed between the passenger's body and the front extension of the second cushion.

6. The airbag system of claim 1, further comprising a third cushion extending from the first cushion to cover the face of the passenger.

7. The airbag system of claim 1, wherein, when deployed, the first and second cushions are configured to cover the outside of the chest of the passenger.

8. The airbag system of claim 6, further comprising fourth and fifth cushions configured to cover another portion of the passenger's body, when deployed.

* * * * *